(12) United States Patent
Campagnolo et al.

(10) Patent No.: US 6,625,523 B2
(45) Date of Patent: Sep. 23, 2003

(54) SYSTEM FOR DATA TRANSFER, FOR EXAMPLE FOR CYCLES SUCH AS COMPETITION BICYCLES

(76) Inventors: Valentino Campagnolo, Corso Padova, 184-36100, Vicenza (IT); Gianfranco Guderzo, Via Santa Clara, 9-36070 Tezze-Arzignano, Vicenza (IT)

( * ) Notice: Subject to any disclaimer, the term of this patent is extended or adjusted under 35 U.S.C. 154(b) by 0 days.

(21) Appl. No.: 09/803,933

(22) Filed: Mar. 13, 2001

(65) Prior Publication Data

US 2001/0027359 A1 Oct. 4, 2001

(30) Foreign Application Priority Data

Mar. 29, 2000 (IT) ...................................... TO2000A0296

(51) Int. Cl.⁷ .............................. G06F 7/00; B62J 39/00
(52) U.S. Cl. ........................................... 701/1; 340/432
(58) Field of Search ............................... 701/1, 29, 36; 709/208; 340/870.13, 870.14, 432

(56) References Cited

U.S. PATENT DOCUMENTS

| | | | |
|---|---|---|---|
| 4,594,572 A | 6/1986 | Haubner et al. | |
| 4,736,367 A | * 4/1988 | Wroblewski et al. | 307/10.1 |
| 4,780,864 A | 10/1988 | Houlihan | |
| 5,231,872 A | 8/1993 | Bowler et al. | |
| 5,261,858 A | 11/1993 | Browning | |
| 5,335,540 A | 8/1994 | Bowler et al. | |
| 5,435,315 A | 7/1995 | McPhee et al. | |
| 5,527,239 A | 6/1996 | Abbondanza | |
| 5,936,520 A | * 8/1999 | Luitje et al. | 340/3.51 |

FOREIGN PATENT DOCUMENTS

| | | |
|---|---|---|
| DE | 3445617 A1 | 7/1985 |
| DE | 3709587 A1 | 10/1987 |
| DE | 4004981 C1 | 5/1991 |
| DE | 29604853 U1 | 7/1996 |
| EP | 0 048 662 A1 | 3/1982 |
| EP | 0 081 807 A1 | 6/1983 |
| EP | 0416325 A2 | 8/1990 |
| EP | 0 820 923 A1 | 1/1998 |
| EP | 0 887 251 A1 | 12/1998 |
| FR | 2533025 | 9/1982 |
| FR | 2654698 | 11/1989 |
| GB | 2166598 A | 5/1986 |
| GB | 2188459 A | 9/1987 |
| GB | 2188489 A | 9/1987 |
| JP | 57-14107 | 1/1982 |
| JP | 5347649 | 12/1993 |
| JP | 5347650 | 12/1993 |
| JP | 5347651 | 12/1993 |
| WO | WO 89/00401 | 1/1989 |
| WO | 92/14620 | 9/1992 |
| WO | WO 93/16891 | 9/1993 |

OTHER PUBLICATIONS

Campagnolo, "Multiprocessor Control System For Cycles, For Example For Competition Bicycles", U.S. patent application Publication No. US 2001/0027495 A1, Oct. 4, 2001.

* cited by examiner

*Primary Examiner*—Michael J. Zanelli
(74) *Attorney, Agent, or Firm*—Volpe and Koenig

(57) ABSTRACT

A system for data transmission on board a vehicle, such as a cycle, includes a set of peripheral modules which can be associated to respective sensors for generating respective sensing signals, and a main unit designed to receive the sensing signals coming from the set of peripheral modules. The peripheral modules are configured to transmit the sensing signals in a selective way and in the framework of respective transmission time slots determined by the main unit according to a general criterion of measurement of transmission times and power consumption.

39 Claims, 6 Drawing Sheets

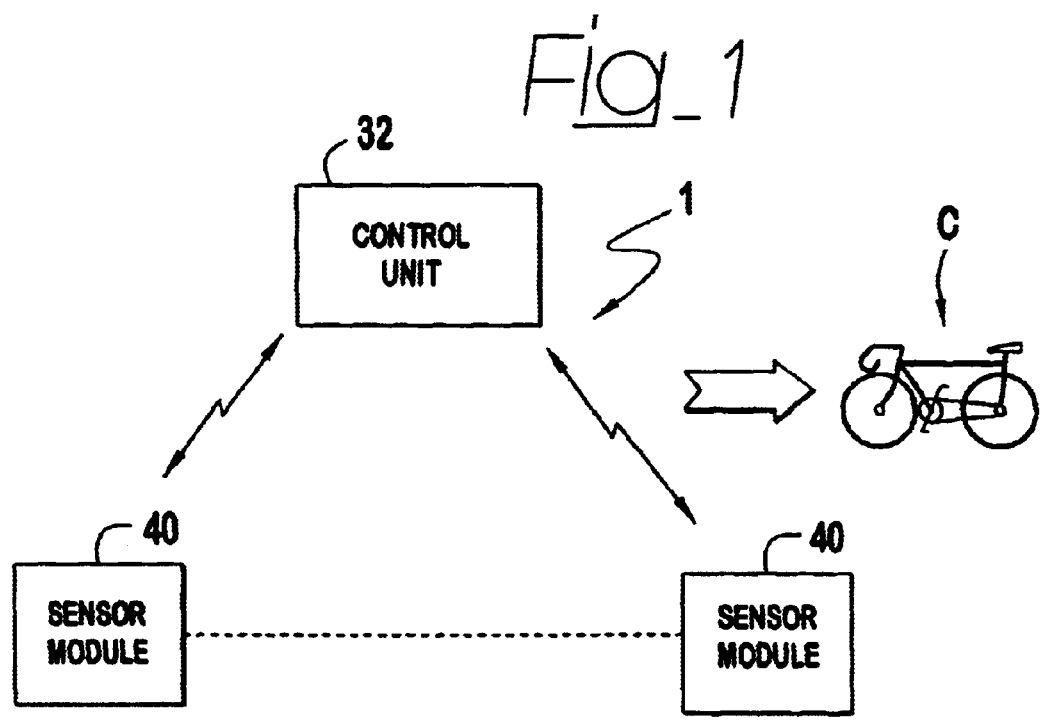
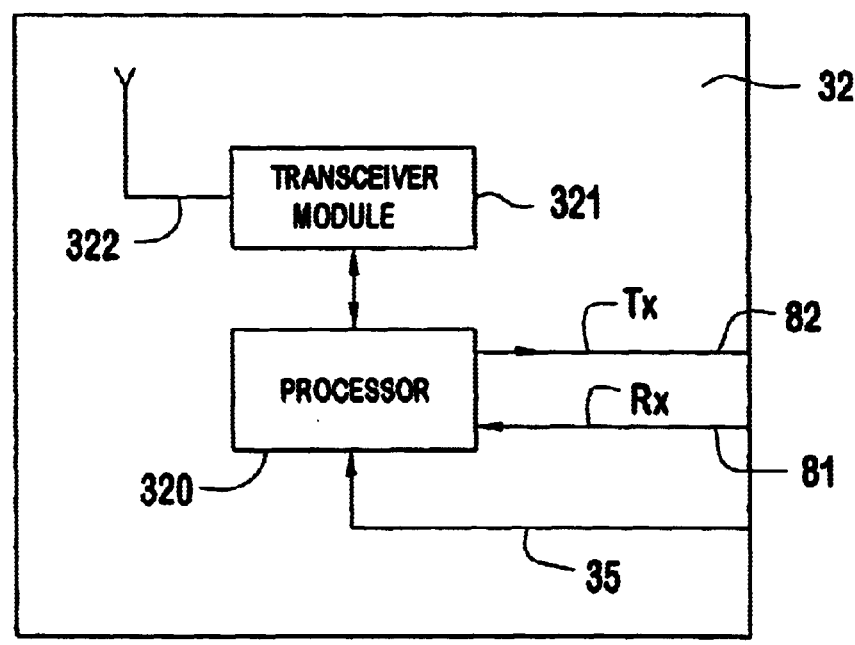

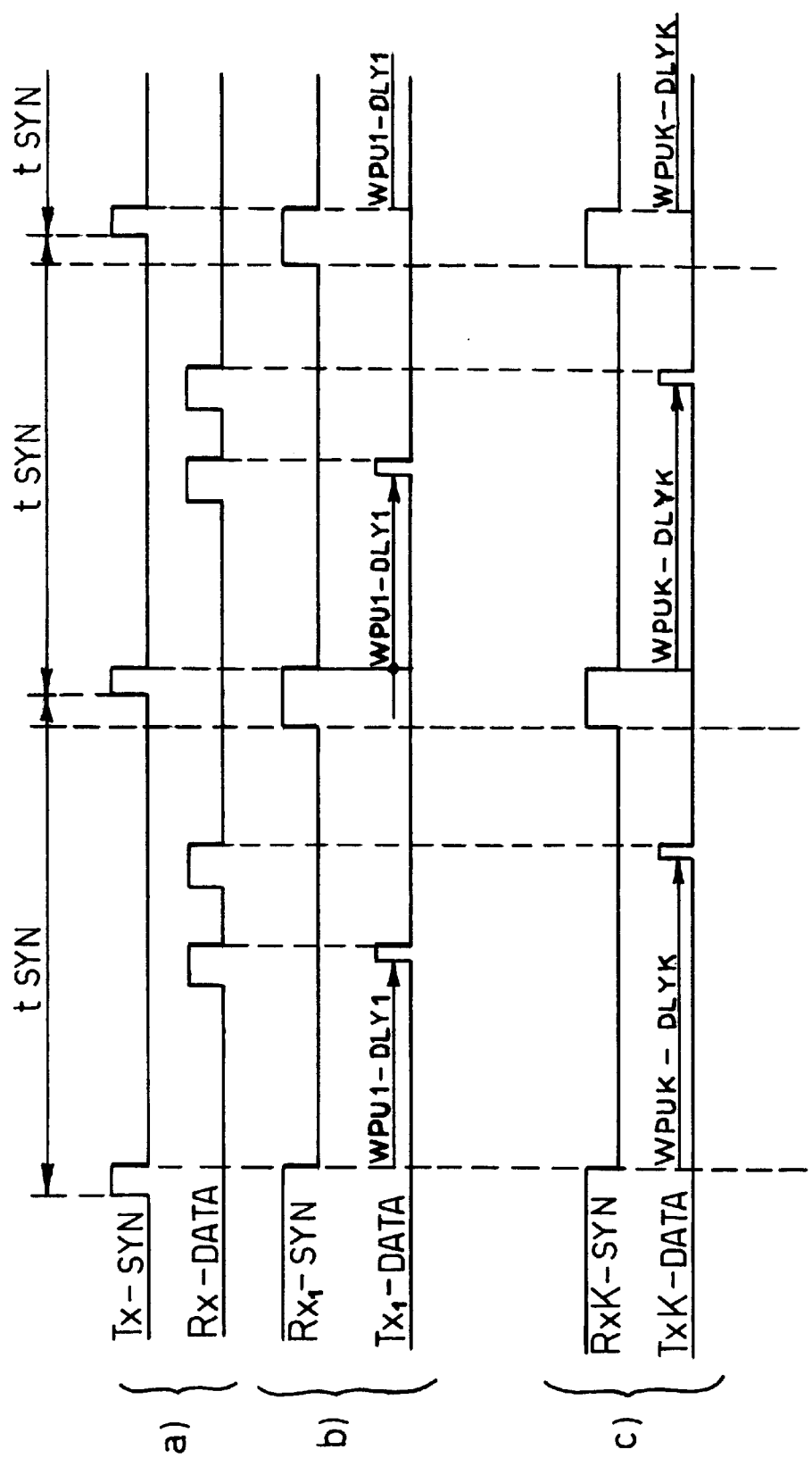

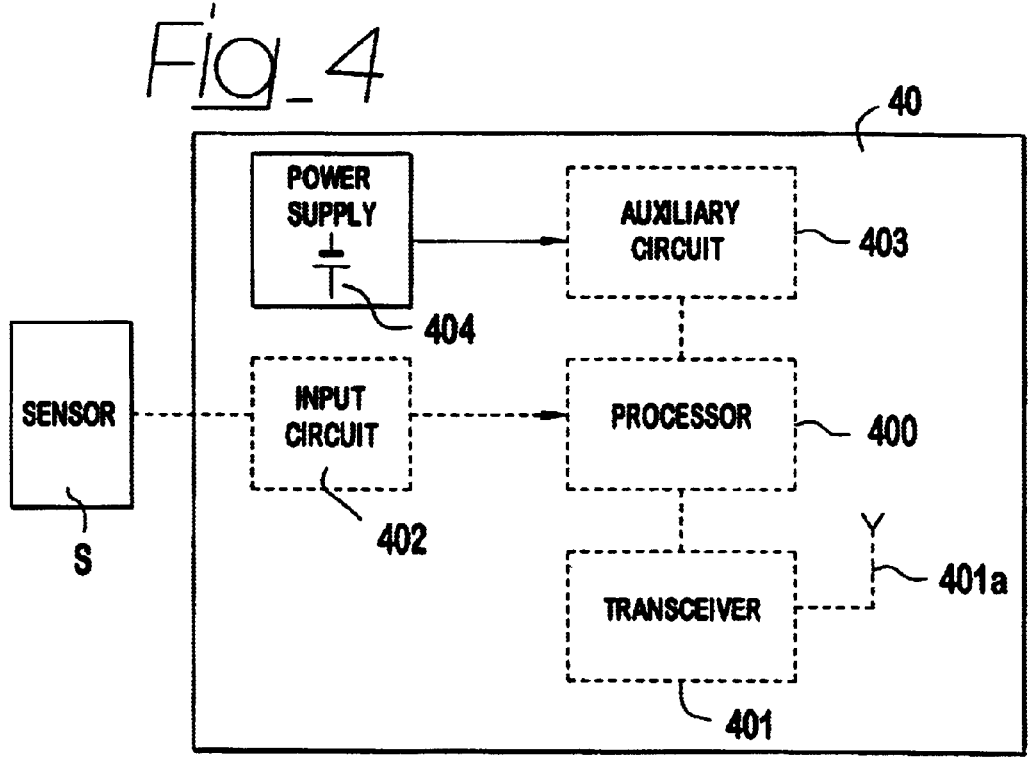
Fig_4
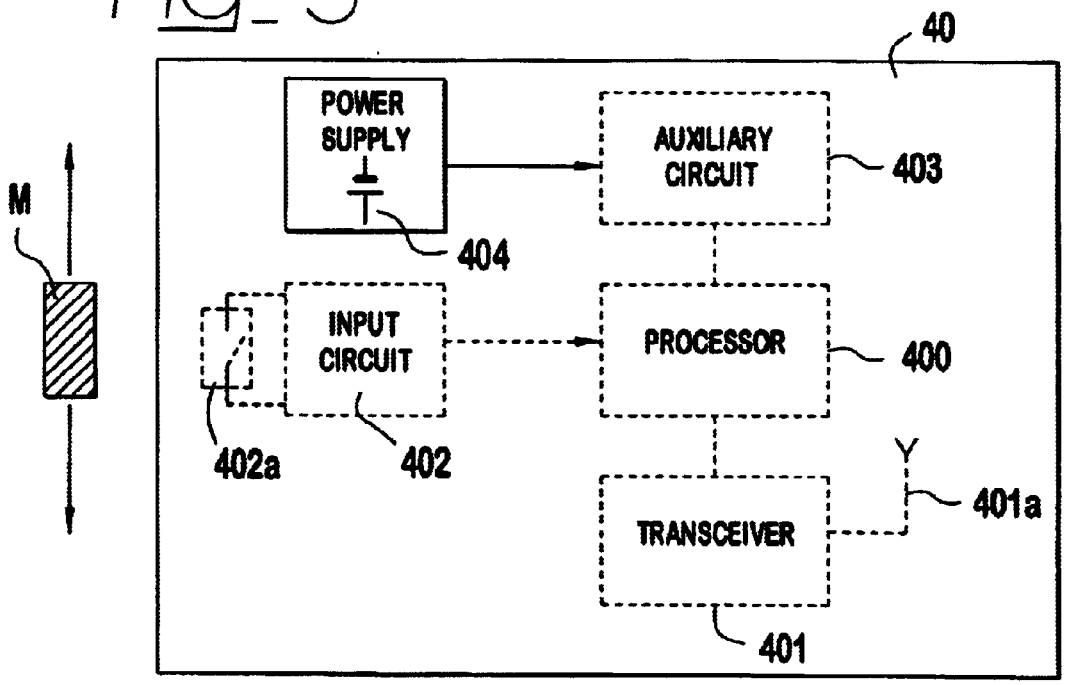
Fig_5

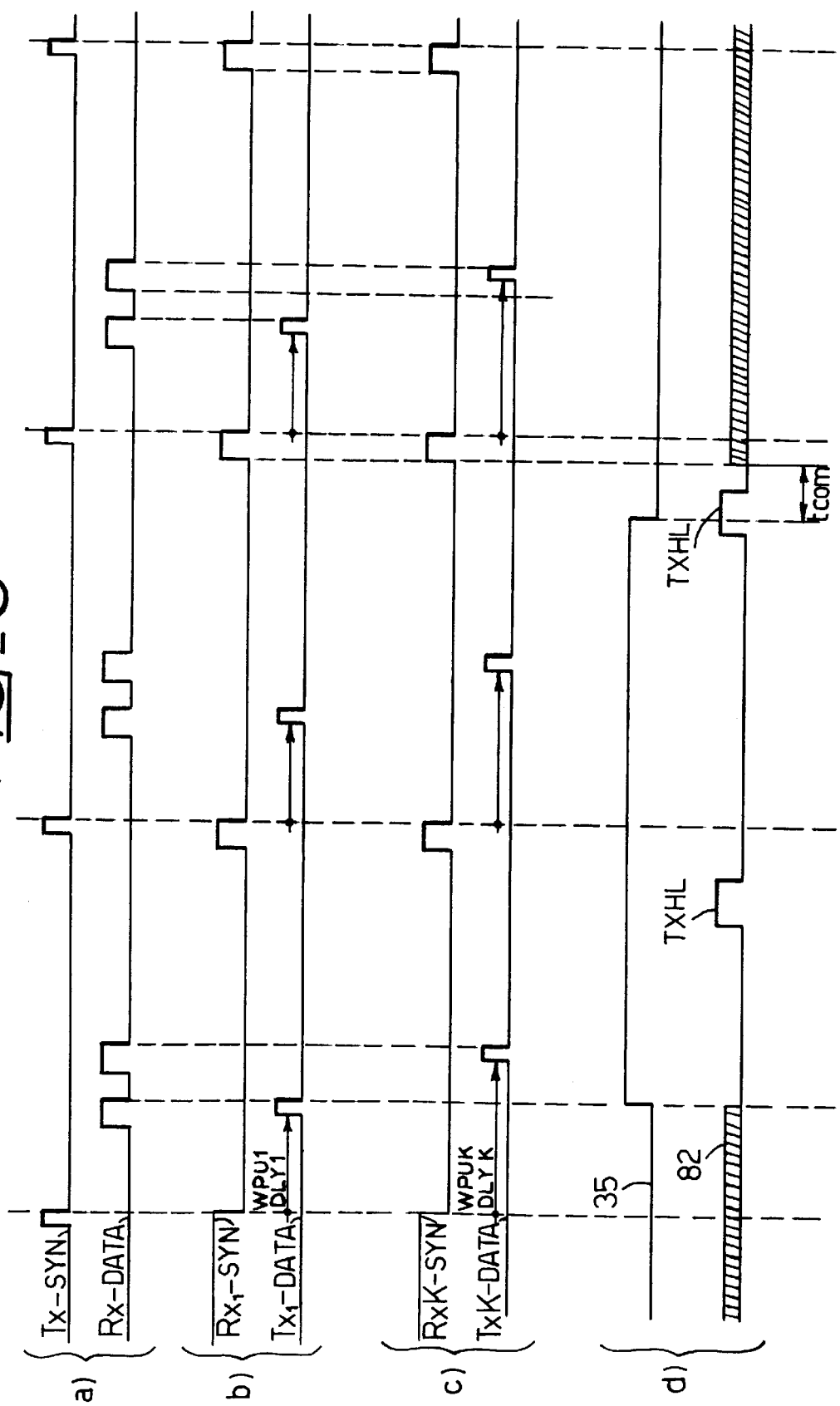

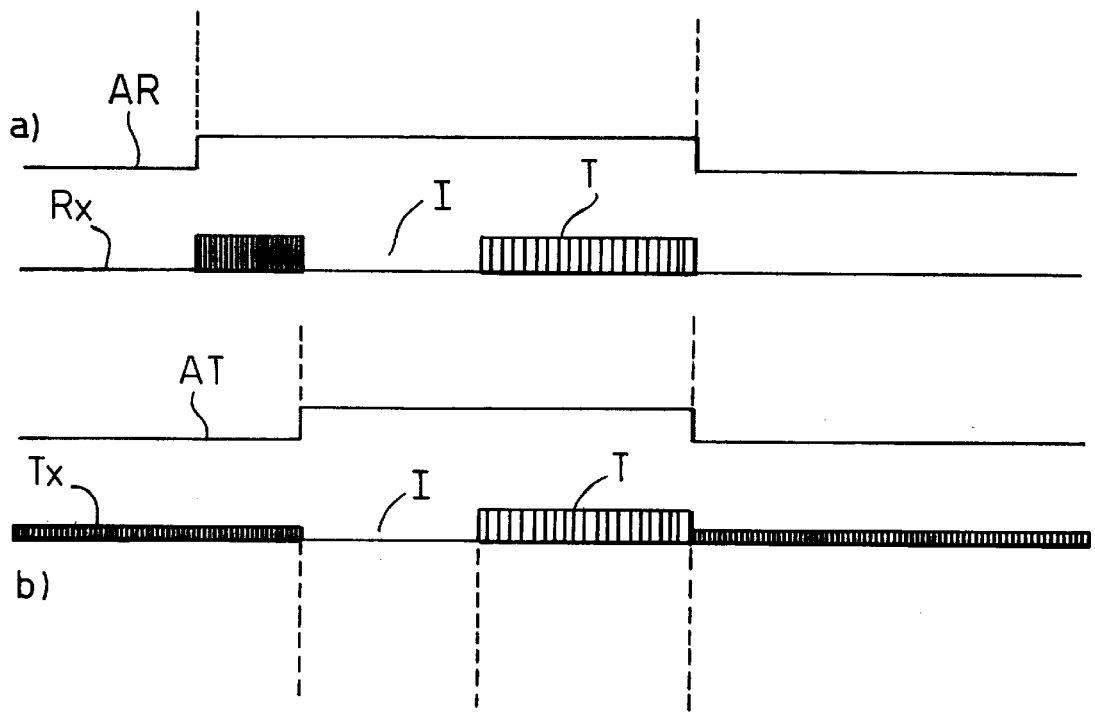
Fig_7
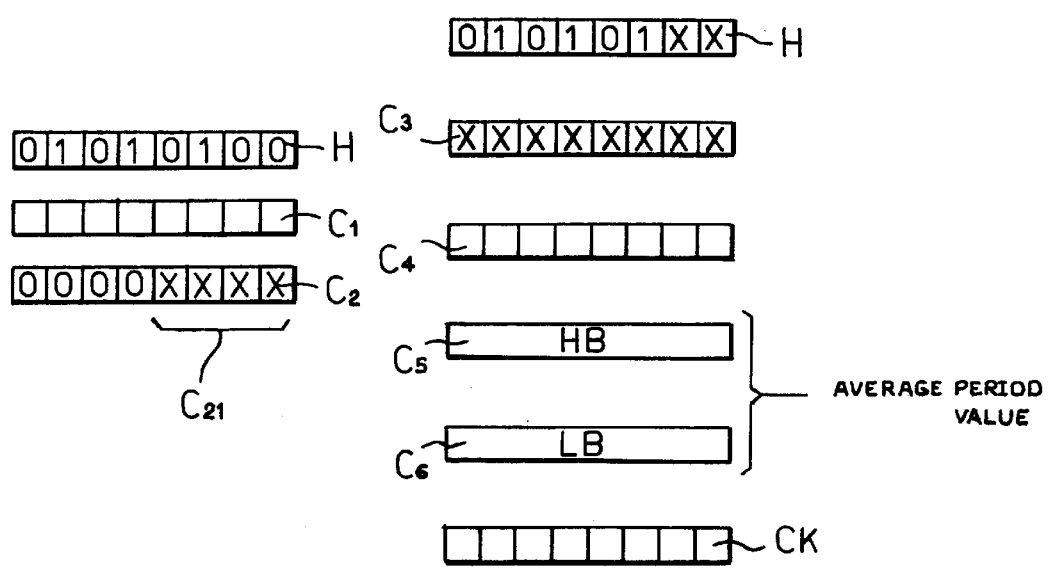
Fig_8
Fig_9

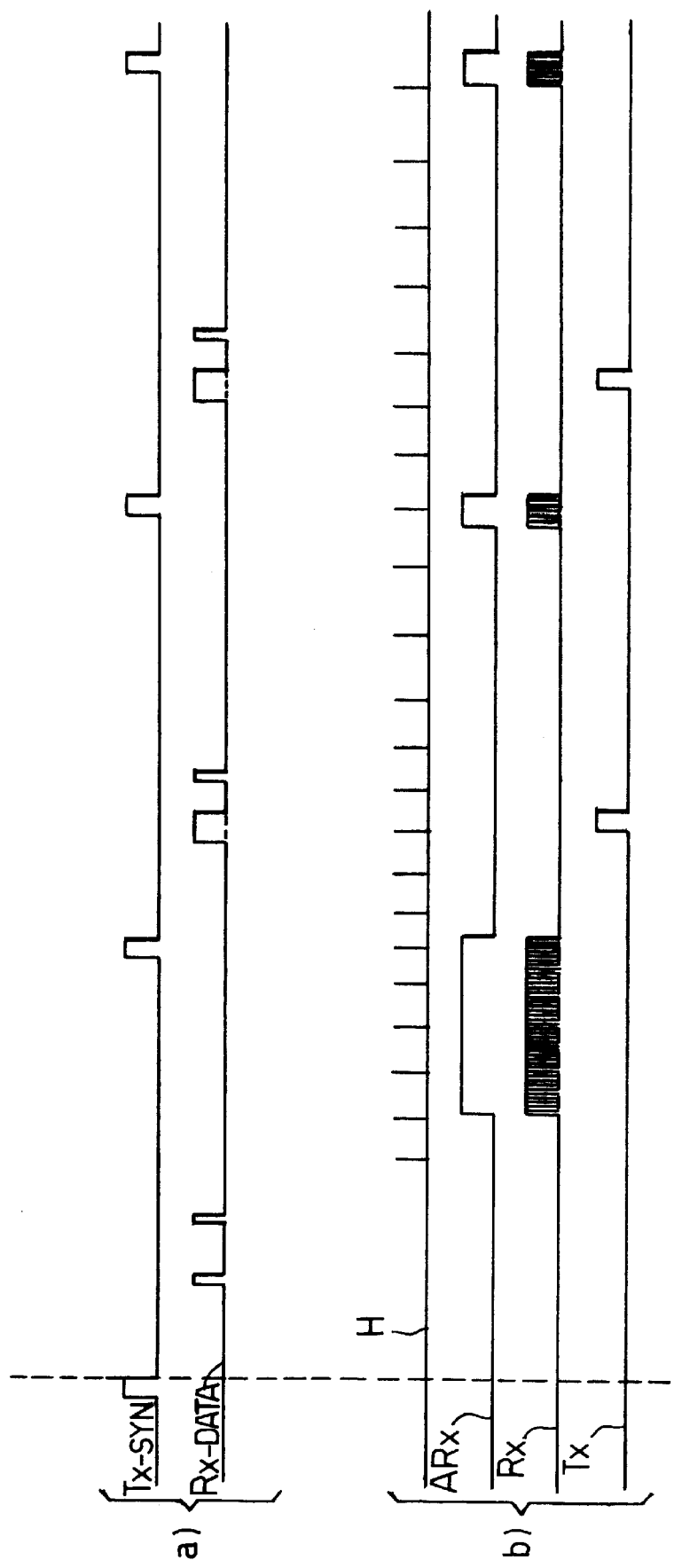

SYSTEM FOR DATA TRANSFER, FOR EXAMPLE FOR CYCLES SUCH AS COMPETITION BICYCLES

BACKGROUND OF INVENTION

The present invention relates to data transfer systems and has been developed with particular attention paid to the possible application to cycles, such as competition bicycles. In any case, the reference to this possible application, and in particular the reference to the application to racing bicycles, must not be interpreted as limiting the possible field of application of the invention.

Over the last few years there has developed, in the cycle sector, the tendency to associate to cycles sensors of various nature so as to be able to acquire information of various kinds regarding the use/behaviour of the means, for instance, in order to be able to intervene through actuators to modify—according to certain criteria, acting both in an automatic way and according to specific commands issued by the user the conditions of use/behaviour of the means, in particular as regards its set.

This tendency is expressed, in particular, in the direction of a continuous increase in the quantity of data picked up and processed, which results in the need to have available increasingly more sophisticated and articulated systems, these being systems which, since they have to be mounted on board the cycle, must not adversely affect the performance of the latter, in particular in terms of weight, overall dimensions, and consumption of electrical energy.

SUMMARY OF THE INVENTION

The purpose of the present invention is to meet the ever-greater needs felt in the sector, overcoming the drawbacks outlined above.

According to the present invention, this purpose is achieved thanks to a system having the characteristics specifically called for in the claims which follow.

In particular, the invention makes possible an interfacing solution, such as to enable a limitation of the amount of connections linked to the transfer of data in the context of the system.

In this way it is possible to reduce the connections, eliminating at least part of them.

In particular, the solution according to the invention proves especially advantageous for applications of a wireless type, i.e., via data transfer on a carrier (or possibly optical means). This enables the use, for instance of networks of the type currently known as Wireless Local Area Networks (WLANs), the foregoing with the possibility of increasing the number of interfaceable sensors and with a reduction in data-transfer times.

In particular, the solution according to the invention exploits the randomness with which a fair number of the events involving the sensors occur in order to achieve transfer of the information in a predictable and reliable way without prejudice to an important aspect, such as that of power absorption, and hence that of operating autonomy of the system.

In the currently preferred embodiment, the invention envisages the creation of a local communication network which can be located on a bicycle. Present in this network are a main network manager and a set of peripheral modules provided with a capacity of their own for pre-processing the signal and with autonomy from the energy standpoint.

The operating criterion is of the master-slave type, with a main unit configured as master for the network that is designed to generate the synchronizing signals, to which the various modules forming part of the system, configured as slave units, refer to communicate their information.

Reserved to each module is a time slot, within which transmission can take place, and this enables, among other things, identification of the sensor and the corresponding signal even without including, in the signal transmitted by the sensor, a respective set of data identifying the sensor and/or the signal transmitted by it.

Bi-directional communication is made possible between the master unit and the peripheral modules so as to enable configuration of the network in an optimal way and improvement of reliability of communication.

Preferably, communication is not made when the event (for example, an individual pulse indicating rotation of a wheel, an individual pulse indicating pedal cadence, etc.) occurs, but rather in appropriate points in time.

Preferably envisaged is the possibility of pre-processing the information of the sensors locally and making this information available for transfer when pre-determined conditions arise.

Preferably, the transmission of the data item from the sensor only occurs when there exists an effective need to inform the processing/display unit normally associated to the system.

The aforesaid need to transmit information is usually linked to the fact that the event detected has a character of importance for the processing unit. With reference, by way of example, to a cycle, such as a bicycle, if the bicycle is stationary there is no need to occupy the communication channel (with the consequent power consumption). Likewise, if the bicycle is being pushed by hand (consequently, at a low speed, below a pre-defined limit), it is not necessary to transfer the information regarding rotation of the wheel to the processing unit.

Along the same lines, if the rider of the bicycle is not pedalling, or if the pedalling force is below a pre-set minimum limit, there does not exist the need to transmit the signals of the pedal-cadence sensor and/or of the pedalling-force sensor to the processing unit.

Preferably, the peripheral pre-processing modules are able to process the information coming from the corresponding sensors before deciding to make the said information available for communication.

In a preferred way, the aforesaid peripheral modules are of the wireless type and envisage basically:

- a microcontroller for processing the information coming from the corresponding sensor and for performing the function of controlling the radio-frequency communication part;
- a radio-frequency transceiver that can enable sending and receiving of data on a radio-frequency channel according to modalities and techniques coordinated by the microcontroller; and
- a power-supply source, for instance a local battery, which makes it possible to achieve autonomy from the energy standpoint; preferably associated to the source is a circuit for monitoring the level of charge of the power-supply source itself.

Preferably, installation modalities of the plug-and-play type are envisaged, as well as specific functions that can pre-qualify the behaviour of the device when this is introduced into the network.

An important characteristic of the solution according to the invention is linked to power consumption: by shortening the times of occupation of the transmission channels, and in particular of the radio-frequency channel, it is possible to reduce power consumption to the minimum.

Preferably, the microcontrollers of the peripheral modules are configured (usually at a level of strategy of the corresponding firmware) in such a way as to carry out the following functions:

- detection of signal (acquisition, filtering, conditioning, etc.);
- processing, so as to bring the corresponding information into a format usable by the main processing and display system;
- activation of algorithms for optimization of power consumption; and
- implementation of algorithms for recovering information in the presence of possible errors on the communication channel (i.e., in situations in which the information does not reach destination).

The plurality of sensors that can be mounted on the cycle, the corresponding reactivity that is desirable in the control system, and the techniques of modulation designed to guarantee optimal reliability of the communication channel point towards the use of relatively high frequencies as preferential for the purposes of radio-frequency communication.

In the currently preferred embodiment of the invention, radio-frequency devices are adopted which preferably use Industrial-Scientific-Medical (ISM) frequency bands, and hence frequencies from 902 to 928 MHz and from 2400 to 2483.5 MHz, and frequency bands for Short-Range Device (SRD) applications, in particular from 433 MHz to 434.8 MHz, from 868 to 870 MHz, and from 2400 to 2483.5 MHZ. Preferably, with such devices relatively short communication times may be obtained, with a greater possibility of transmitting information of a number of sensors per unit time.

BRIEF DESCRIPTION OF THE DRAWINGS

There now follows a description of the invention, provided purely by way of non-limiting example, with reference to the attached drawings, in which:

FIG. 1 illustrates, in the form of a block diagram, the general architecture of a system according to the invention;

FIG. 2 is a first timing chart illustrating the modalities adopted for transmission of the information in the framework of the system according to the invention;

FIG. 3 is a further block diagram illustrating, in a more detailed way, the structure of one of the elements that may be seen in FIG. 1;

FIGS. 4 and 5 illustrate the two possible implementational solutions with reference to the structure of another of the elements shown in FIG. 1;

FIG. 6 is a further timing chart, basically similar to the timing chart of FIG. 2, which illustrates further particularities of signal transmission in the framework of the system according to the invention;

FIG. 7 is a timing chart illustrating further particularities of signal transmission in the framework of the system according to the invention;

FIGS. 8 and 9 illustrate two examples of frames that may be used for signal transmission in the framework of the system according to the invention; and FIG. 10 is a further timing chart illustrating the modalities of signal transmission in the framework of the system according to the invention.

DETAILED DESCRIPTION OF THE INVENTION

In the general diagram of FIG. 1, the reference number 1 designates, as a whole, a communication system according to the invention, designed, preferably, to be mounted on a cycle, such as a competition bicycle C. As has already been said, the reference to this possible application is not to be in any way interpreted as limiting the scope of the invention. In any case, specific modalities for monitoring a system, such as the system 1, on a bicycle are illustrated in U.S. patent application Ser. No. 09/805,113, now U.S. Patent Publication No. US 2001/0027495 A1.

Basically, the system 1 is made up of a control unit 32 connected, typically by means of communication channels of a wireless type (preferably on a radio-frequency carrier, for example at approximately 400 MHz or approximately 900 MHz), to a plurality of peripheral modules 40. The latter modules are in turn designed to be associated to respective sensors for processing the corresponding information and to transfer the said information to the unit 32 according to the modalities described in greater detail in what follows. In general, the mechanism of interaction between the unit 32 and the modules 40 is of the master-slave type, with the unit 32 functioning as master unit and the modules 40 functioning as slave units.

As may be better seen in FIG. 2, the transfer of data from the modules 40 to the unit 32 in general takes place according to a time-sharing criterion.

In particular, the timing chart of FIG. 2 is made up of three parts set on top of one another.

The part designated by the reference a) refers to the operation of the master unit 32. Represented in the top diagram of FIG. 2 is a synchronization signal TX-SYN transmitted by the unit 32 at a pre-set rate (period $t_{syn}$) and designed to be received by all the modules 40 forming part of the network.

The diagram represents a signal RX-DATA, the high-logic-level portions of which identify the time slots (selectively determined according to the criteria described more fully in what follows) in which the unit 32 sets itself for receiving the signals coming from the various modules 40.

The parts b) and c) of FIG. 2 illustrate, instead, the behaviour of the various modules 40 included in the system, in particular as regards a first module, generically identified by the suffix 1, and a generic module, identified by the suffix k.

In particular, when there is the need to transfer an item of information to the unit 32, each module 40 (which is reached by the synchronization signal coming from the unit 32) uses the signal TX-SYN as reference to wait for a delay interval uniquely associated to it (indicated in general as WPUk-DLYk, where k=1, . . . , n), and then to activate its transmission signal TXk-DATA for the time necessary for transmission.

From FIG. 2 it may be understood that there is assigned to the various peripheral modules 40 a delay which is different from the synchronization signal, the aim of this being to avoid possible collisions in transmissions, so rendering communication altogether predictable. The communication modality described presents the additional advantage of enabling the unit 32 to recognize automatically the peripheral module 40 that is transmitting, according to the time slot in which reception occurs, all this without the need to provide, in the string of data transmitted from the modules 40 to the unit 32, sets of data identifying the module 40 each time concerned.

FIG. 3 illustrates in greater detail the structure of the unit 32 in the form of a block diagram.

In the diagram of FIG. 3 it is possible to identify in particular a processor 320 designed to function as a processor for controlling the communications. The processor 320 manages the timings required for carrying out all the steps involved in transfer of the information in the framework of the system via the control of a transceiver module, designated by the reference number 321, which carries associated thereto an antenna 322.

The processor 320 is configured in such a way as to be able to exchange information, and in particular in such a way as to be able to transfer the data coming from the system network 1 to an external display/processing unit (not illustrated), which may be identified as a unit of a higher hierarchical level.

The above is preferably obtained by asynchronous serial bi-directional interfacing on corresponding reception lines 81 and transmission lines 82. In an even more preferred way, the above is obtained according to the modalities described in greater detail in the U.S. patent application Ser. No. 09/805,113, now U.S. Patent Publication No. US 2001/0027495 A1.

The module 321 interfaces the transmission channel directly with the modules 40 both as regards reception and as regards transmission of the information. This takes place preferably via modulation techniques such as to ensure a high degree of reliability even in hostile environments. Preferably, FSK modulation is used for transmission.

In a preferred way, the transceiver antenna 322 is integrated in the unit 32 in such a way as to enable mounting of the latter on a cycle, for example in position lower than that of the bottle-cage.

In the block diagram of FIG. 4 it is possible to note that each module 40, designed to be associated to a respective sensor S, comprises, as its main core, a respective processor 400 which has the job of coordinating and specializing the functions of the module 40 itself. The activity of the processor 400 is determined by the detection of the signal of the sensor and by the consequent processing of this signal. Apart from the above situations, the module is normally in conditions of quiescence, namely of low power absorption. Associated to the processor 400, according to modalities basically similar to those seen with reference to the block diagram of FIG. 3, is a transceiver 401 designed to manage, at a physical level, the radio-frequency channel both to and from the unit 32. This obviously takes place according to modulation techniques compatible with those adopted for the unit 32, for example using FSK modulation. Also in this case, the transceiver antenna, designated by 401a, is preferably integrated in the unit. An input circuit 402 is moreover provided, which is designed to interface the sensor S with the processor 400. The characteristics of the circuit 402 (designed to perform functions such as signal conditioning, digital-to-analog conversions, etc.) are of course specific for the type of sensor S concerned.

For example, the diagram of FIG. 5 refers to the specific case of a sensor, such as a sensor for speed of rotation of a wheel or a signal for detecting pedal cadence. These are sensors usually comprising, as sensing element, a magnet M mounted on the moving member concerned (wheel or crankset, in the case of the above examples). In the case in point, the input circuit 402a may comprise, or else carry associated thereto, an element such as a reed relay 402 which is alternately switched between an open position and a closed position whenever the magnet M passes in front of it.

Any person skilled in the sector will in any case appreciate that, since the characteristics and operating modes of the various sensors that may be mounted on board a cycle are altogether different, the specific characteristics of the circuit 402 may be altogether different from one module 40 to another. In any case, these specific implementational aspects are to be deemed widely known, and therefore such as not to require a detailed description herein, also because they are in themselves not important for the purposes of understanding and implementing the present invention.

Both in FIG. 4 and in FIG. 5, the reference number 403 designates an auxiliary circuit capable of monitoring, by transmitting signals to the processor 400, the state of a power-supply source (typically, a battery) 404, which is designed to ensure power supply to the module 40.

For a better understanding and interpretation of what will be said hereinafter with reference to the modalities of transmission of the information in the context of the system according to the invention, it should be recalled that the solution according to the invention aims, among other things, at reconciling, in an advantageous way, needs that are altogether in contrast with one another; namely:

the possibility of providing each module 40 with a corresponding power-supply source, thus avoiding the need to provide, for this purpose, lines for power-supply transmission in the context of the system, at the same time ensuring the possibility of inserting into the system or removing from the system—depending upon the specific applicational requirements—one or more sensors according to typical plug-and-play modalities of use;

the need to bestow on each individual module 40 a considerable autonomy of operation (for example, in the region of one year) even in the presence of very intense use of the means on which the system is mounted; and the possibility of using power-supply sources having very reduced dimensions, such as, typically, batteries for watches, thus preventing the increase in the number of sensors from resulting in the means becoming undesirably heavy.

With reference again to the block diagram of FIG. 3, the ensemble of the reception signal present on the line 81 and of the transmission signal present on the line 82, together with a control signal present on a line 35, enables the unit 32 to form part of a physical communication bus towards higher-level units, so causing the transmission signal (line 82) to be driven exclusively during the enabling phases imposed by acting on the line 35, and otherwise maintaining the signal 82 deactivated or released.

This mode of operation makes it possible to limit power absorption, hence consumption, by the unit 32 just to the time phases in which actual operation is required.

As will be better seen in what follows, substantially similar operating modes are adopted also as regards the modules 40.

If the enabling signal 35 imposes deactivation of the unit 32 while the latter is transmitting, the possibility is usually envisaged of granting the unit 32 itself a pre-set time for completion of the communication before giving rise to the effective releasing of the transmission signal present on the line 82.

This fact may be appreciated in the timing chart of FIG. 6, which comprises four parts set on top of one another, of which the parts a), b) and c) basically correspond to the parts a), b) and c) of FIG. 2. Moreover present in the timing chart of FIG. 6 is a further diagram, designated by d), which represents a typical waveform of the control signal present on the line 35 (the high level of which corresponds to enabling of the processor 320), whilst the reference 82 designates a possible waveform of a transmission signal present on the homologous line.

Again in FIG. 6 it may be noted that the control unit 32 is activated for transmission only once in the interval between one synchronization and the next, whereas, in the same interval, it is activated for reception a number of times equal to the number of the peripheral modules 40. A further time slot within the interval between two successive synchronizations is moreover dedicated to data transfer (on the line 82) to the higher-level unit referred to previously. The latter slot is designated by TXHL.

On the other hand, the unit 32 is always active (hence, also in the state previously defined as quiescent state) for generating the synchronization signal TX-SYN, which constitutes a fundamental reference for the system network. The firmware of the module 321 is preferably provided with a function that enables optimization of the times for activating the radio frequency, and hence optimization of the corresponding consumption. Besides the generation of the synchronization signal (which is unique for all the modules 40 forming part of the network), also the time for which the unit 32 remains active awaiting the response from the various peripheral modules is optimized. This means that activation of the reception function in the module 321 is slightly advanced with respect to the moment when transmission by one of the modules 40 is expected. This advance is monitored and maintained at an optimal minimum value for guaranteeing correct time-locking.

The above-mentioned function moreover envisages recognition of events characteristic of the valid communication for deciding whether to maintain the receiving part of the module 321 activated or not. This further enables any waste of electrical energy to be prevented when there occurs a reception the contents of which are found to be insignificant right from the initial moments of the reception itself.

If, for example, a module 40 does not have any information to transmit, the module does not activate its own transmitter, and hence the unit 32 does not need to activate for receiving the corresponding data block. This absence of signal transmission by the module 40 (acting as a slave) is recognized by the unit 32 (acting as a master) because, at the moment in time concerned, a particular signal sequence indicating that the corresponding transmitter is active is not received.

The unit 32 is therefore able to recognize this event and decide in favour of disabling of the reception phase for the module 40 concerned according to the last synchronization signal transmitted.

If, in particular conditions, there is no event such as to justify a transmission by the module 40 (for example, because the module in question is associated to a wheel-speed sensor, and the bicycle is stationary), albeit maintaining the rate of generation of the synchronization signal TX-SYN active, the unit 32 is able to reduce to the minimum turning-on of its own receiver during the various time slots for which it sets itself in a wait state for receiving responses.

Likewise, transfer of information to the higher-level time unit (time slot TXHL in FIG. 6d) is activated only if valid data have arrived from any of the modules 40.

This result may be obtained, for example, by causing a transmission to be characterized by an initial phase in which the transmitter each time concerned gets its own activation to be recognized by emitting a signal sequence for a given time interval, as illustrated in FIG. 7.

The above condition can be recognized in so far as the transmitted signal becomes prevalent with respect to the background noise detectable when no network transmitter is active. A further discrimination element is constituted by the fact that the said signal is sought at precise moments in time referred to the synchronization signal, and consequently there is less likelihood of error being caused by disturbance.

The initial phase of recognition of the beginning of a transmission is followed by a set of bits which assume a given meaning.

For example, in the transmission of the synchronization signal by the unit 32, it is possible to identify:

a fixed sequence of bits, indicating the start of the leading part of the data frame;

certain bits in which the address of the transmission source (namely, the unit 32), which identifies the network as a whole, is encoded;

certain bits representing the code of the request made by the unit 32 to the modules 40 (for example, the communication of a new logic address in the system network);

certain bits indicating the outcome of the previous communication; for example, if four modules 40 form part of the system network, four bits are transmitted that provide information as to whether the data received with the previous communication have been found valid; these bits are defined at the level of the unit 32 after a control has been carried out on what has been received and on the corresponding control field; and certain bits containing the network address to which the synchronization signal is to be sent.

The same criterion is adopted, as is better illustrated in FIG. 7, in transmission from any one of the modules 40 to the unit 32.

In particular, the timing chart of FIG. 7 comprises two parts, designated by a) and b).

Of the above two parts, the first represents the reception-enabling signal AR of the receiver of the unit 32 (with high logic level when the receiver is active) and the corresponding reception-control signal RX.

The bottom part of FIG. 7 illustrates the transmission-enabling signal AT of a module 40 (also in this case, the high logic level corresponds to activation) and the corresponding transmission signal TX.

In particular, in the bottom diagrams of both of parts a) and b) of FIG. 7, the reference I designates the initial phase, and the reference T the phase in which there is transmission of information.

Consequently, also in the case of transmission by the module 40, in the transmission phase T it is possible to identify:

a fixed sequence of bits designed to indicate a leading portion of the data frame;

certain bits in which the logic address of the source of transmission is encoded, i.e., that of the module 40 concerned; it will be appreciated that, as has already been said, the presence of these bits is optional, given that the unit 32 even so is able to identify the individual module 40 according to the time interval in which the said module transmits, and in particular according to the delay of said time interval with respect to the synchronization signal;

certain bits containing the address of the unit 32, and hence the network address to which the module 40 that is transmitting refers;

certain bits identifying the level of charge of the power source (block 404 of FIGS. 4 and 5) of the corresponding module 40;

certain bits containing the specific datum of the sensor S associated to the module 40 that is transmitting; and certain bits for controlling the integrity of the data.

FIG. 8 illustrates the possible organization of a frame transmitted for the synchronization signal from the unit 32.

This is preferably a byte frame where the fixed sequence of bits which identifies the leading portion of the frame is designated by H. The part containing the encoding of the address of the unit 32 is designated by C1, and the field C2, which comprises one or more bytes, is designed to carry the other data referred to previously. In particular, the reference C21 designates the set of bits that identify the outcome of the previous communication.

FIG. 9 represents, according to the same modalities, the various fields making up the frame, this too being preferably organized in bytes and being used for transmission from the modules 40. Also in this case, there is present a leading part H followed by a set of fields C3, C4, C5, and C6, which are designed to carry respectively the state of charge of the power-supply source, the address of the module 40 (if this information is present), as well as (in the case of the fields C4 to C6) the significant data, there further being provided a final field CK constituted usually by a single byte having a control function.

The unit 32 is therefore able to evaluate the validity of the data received from the various modules 40 and recognize whether the communication comes from one of the modules making up the system network, this in so far as in each transmission from the modules 40 the network code is always present. This latter aspect is important for the purpose of avoiding any possible interference between two networks that accidentally find themselves operating alongside one another (for example, because they are mounted on the bicycles of two cyclists who are pedalling one alongside the other). The possible occurrence of these phenomena of interference is moreover very small indeed in view of the specific modalities used for data transmission (as is better illustrated by the timing charts of FIGS. 2 and 6). The possible collision of data presupposes in fact that, in an altogether accidental way, transmission occurs according to similar modalities, exactly in the same time slot.

In any case, if the condition is detected whereby successive communications of the network are not valid or are disturbed by transmissions from transmitters extraneous to the system network, the unit 32 is able to decide, according to a pre-defined strategy, to change the logic address of the network, transmitting the new address to the modules forming part of the network.

As has already been said previously, each module 40 is preferably organized in such a way as to remain as far as possible in conditions of low current absorption.

The activity is dependent upon the type of sensor S that is to be interfaced. In the case of sensors operating in on/off mode (for example, a sensor for detecting the pulses for rotation of the wheels of a cycle, or else a sensor for detecting pedal cadence), the module is active when the event to be detected arises, this occurring for the duration necessary to detect the event and to analyze it in relation to the preceding event. If the result corresponds to an important item of information for a higher-level unit, the step of information transfer (i.e., the communication) is enabled.

If the signal is of the analog type (as in the case of force sensors, various potentiometric sensors, etc.), the activity of the corresponding module 40 is of the cadenced type, according to a pre-defined frequency, and is enabled by means of a communication from the higher-level manager.

The module 40 moreover sees to managing the step of information transfer when this is required. For this step it is important for there to be time-locking with the synchronization signal of the unit 32, and hence the module 40 must set itself to receive the sync frame.

After recognition of the valid synchronization, the module 40 activates transmission of its own data block according to the delay envisaged for the module 40, namely in the time slot assigned thereto.

When the synchronization has been locked, the subsequent transmissions can take place according to the criteria of optimization of the on time of the receiver in the proximity of reception of the synchronization and of the time of activation of the transmitter in the proximity of the time slots assigned for the transmission.

These operating criteria are better illustrated in the timing chart of FIG. 10, which once again comprises two parts set one above another, designated by a) and b).

The top part basically refers to the activity of the unit 32 according to modalities altogether similar to the ones already used in the representations of FIG. 2 and FIG. 6.

Instead, the part designated by b) regards the behaviour of the module 40. Here the reference H designates a signal, for example a pulse signal, such as a signal generated by a speed sensor associated to a wheel, the said signal first being absent (left-hand part of diagram), and then present.

The subsequent diagrams illustrate the typical waveform of the enabling signal at reception ARX, the reception signal RX, which allows the module 40 to lock to the network synchronization, and finally the transmission signal TX located in the corresponding time slot.

As has already been said, another function entrusted to each module 40 is that of detecting the state of operation of the corresponding power-supply source (blocks 403, 404 of FIGS. 4 and 5). This function is operative when the system needs to transmit information to the unit 32. In fact, in each data block transmitted, bits carrying the said indication, as shown in FIG. 9, are kept updated.

Another important function is the one regarding verification of the successful outcome of the communication and of the possible recovery of information. With certain types of sensors (for example, the ones for the pulse for rotation of the wheels) it is important not to lose any pulses, in so far as the cumulative count of the pulses indicates the space travelled. In the communication from the module 40 there is thus entered the number of pulses issued since the previous valid communication, and this value is zeroized only after the success of the communication has been verified.

If the verification regarding the last communication made gives a negative result, the last value for the number of a pulse is not zeroized, and the subsequent pulses then increase the number according to a general accumulation mechanism.

In the subsequent transfer attempt, the transmitted number of pulses will be such as to totalize the pulses that have been sent since the last valid communication up to the moment of transmission.

This mechanism is repeated until the number of pulses totalized exceeds a pre-set value. When this value is exceeded, the said strategy of recovery of information is de-activated.

Again in the case of a sensor such as the sensor of pulses for rotation of a wheel, the second part of the information is constituted by the mean value of the period found between the pulses detected between the last two synchronization signals. This value, referred to a pre-set time base, enables the value of the speed to be obtained.

For example, with reference to the frame structure of FIG. 9, the field C4 may be used for transmission of the number of pulses, whilst the fields C5 and C6 may be used for transmission of the aforesaid mean period value.

Of course, without prejudice to the principle of the invention, the details of construction and the embodiments may vary widely with respect to what is described and illustrated herein, without thereby departing from the scope of the present invention.

What is claimed is:

1. A system for data transmission on board a cycle, the system comprising:
    a set of peripheral modules associated with respective sensors for generating respective sensing signals when said sensors detect a predetermined condition, and
    a main unit that outputs a synchronization signal and receives said sensing signals coming from said set of peripheral modules,
    wherein said peripheral modules selectively transmit said sensing signals within a frame work of respective transmission time slots determined by said synchronization signal.

2. The system of claim 1, wherein said synchronization signal is a periodic signal and said time slots are identified according to a respective delay signal starting from said synchronization signal.

3. The system according to claim 1 wherein, said main unit and said peripheral modules comprise respective transceiver modules for wireless transmission of said signals.

4. The system according to claim 3, wherein said transceiver modules are configured for radio-frequency transmission.

5. The system of claim 4, wherein said transceiver modules preferably use frequencies from 902 to 928 MHz and from 2400 to 2483.5 MHz, and frequency bands from 433 MHz to 434.8 MHz, from 868 to 870 MHz, and from 2400 to 2483.5 MHz.

6. The system according to claim 3 wherein, said transceiver modules operate with FSK-type modulation.

7. The system of claim 1, wherein said main unit is configured for picking up said sensing signals and for sending them selectively to a processing unit of a higher hierarchical level.

8. The system of claim 7, wherein transmission from said main unit to said processing unit of a higher hierarchical level takes place in the context of selectively pre-determined time slots.

9. The system of claim 8, wherein the time slots used for data transmission from said main unit to said processing unit of higher hierarchical level are divorced in time from the time slots used for transmission from said peripheral modules to said main unit.

10. The system of claim 7, wherein said main unit is configured for transmission to said processing unit of a higher hierarchical level on a physical channel.

11. The system according to claim 1, wherein said peripheral modules are configured, at least in part, in such a way as to detect the condition of absence of a useful sensing signal to be transmitted, and as to be at least in part switchable into a state of low power absorption upon occurrence of said condition of absence of a useful signal.

12. The system according to claim 1, wherein said peripheral modules comprise, at least in part, a respective module for pre-processing the sensing signal received from the corresponding associated sensor.

13. The system according to claim 1, wherein said peripheral modules carry associated thereto, at least in part, respective power-supply sources, each of which preferably has, associated thereto, a circuit for monitoring the state of said power-supply source.

14. The system according to claim 13, wherein said peripheral modules are configured for associating, to said sensing signal of the respective sensor sent to said main unit, a further signal indicating the state of the respective power-supply source.

15. The system according to claim 1, wherein said main unit is configured for transmitting, to said peripheral modules, a verification signal indicating the outcome of the previous communication to the main unit itself.

16. The system of claim 15, comprising at least one peripheral module which can be associated to a respective sensor for generating a sensing signal represented by a counting value, and in that said at least one peripheral module is capable of detecting, starting from the verification signal received from said main unit, failure of transmission of a previous counting value and of carrying out the subsequent transmission of a counting-detection signal as a cumulative value of the value transmitted in the previous transmission and not received, and of the amount of the counting accumulated starting from said previous transmission.

17. The system of claim 15, wherein said main unit is configured for detecting a persistence of transmission events having negative outcome coming from one of said peripheral modules and for consequently varying the respective network address.

18. The system of claim 1, wherein said main unit is identified by a respective network address, and in that said main unit is configured for selectively communicating variations in said network address to said peripheral modules.

19. A system for data transmission, on board a vehicle, comprising:
    a set of peripheral modules which can be associated to respective sensors for generating respective sensing signals; and
    a main unit designed to receive said sensing signals coming from said set of peripheral modules,
    and wherein said peripheral modules are configured to transmit said sensing signals in a selective way, in the framework of respective transmission time slots determined by said main unit,
    and wherein said main unit is configured for generating a respective synchronization signal of a periodic type, and wherein said time slots are identified according to a respective delay signal starting from said synchronizing signal.

20. The system according to claim 19, wherein said main unit is configured in such a way that it can selectively go, at least in part, into a state of reduced power absorption in the absence of useful information to be received from said peripheral modules, and wherein said main unit is configured for transmitting said synchronization signal also in said state of reduced power absorption.

21. A system for data transmission on board a vehicle, comprising:
    a set of peripheral modules which can be associated to respective sensors for generating respective sensing signals; and
    a main unit designed to receive said sensing signals coming from said set of peripheral modules,
    and wherein said peripheral modules are configured to transmit said sensing signals in a selective way, in the framework of respective transmission time slots determined by said main unit, and wherein said main unit and said peripheral modules comprise respective transceiver modules for wireless transmission of said signals.

22. The system according to claim 21 wherein said transceiver modules are configured for radio-frequency transmission.

23. The system according to claim 21 wherein said transceiver modules operate with FSK-type modulation.

24. A system for data transmission, on board a vehicle, comprising:

a set of peripheral modules which can be associated to respective sensors for generating respective sensing signals; and a main unit designed to receive said sensing signals coming from said set of peripheral modules;

and wherein said peripheral modules are configured to transmit said sensing signals in a selective way, in the framework of respective transmission time slots determined by said main unit, wherein said main unit is configured for picking up said sensing signals and for sending them selectively to said processing unit of a higher hierarchical level, and wherein transmission from said main unit to said unit of a higher hierarchical level takes place in the context of selectively pre-determined time slots.

25. The system according to claim 24 wherein the time slots used for data transmission from said main unit to said unit of higher hierarchical level are divorced in time from the time slots used for transmission from said peripheral modules to said main unit.

26. The system according to claim 24 wherein said main unit is configured for transmission to said unit of a higher hierarchical level on a physical channel.

27. A system for data transmission, on board a vehicle, comprising:

a set of peripheral modules which can be associated to respective sensors generating respective sensing signals; and a main unit designed to receive said sensing signals coming from said set of peripheral modules, and wherein said peripheral modules are configured to transmit said sensing signals in a selective way, in the framework of respective transmission time slots determined by a said main unit, and wherein said peripheral modules are configured, at least in part, in such a way as to detect the condition of absence of a useful sensing signal to be transmitted, and as to be at least in part switchable into a state of low power absorption upon occurrence of said condition of absence of a useful signal.

28. A system for data transmission, on board a vehicle, comprising:

a set of peripheral modules which can be associated to respective sensors for generating respective sensing signals; and a main unit designed to receive said sensing signals coming from said set of peripheral modules, and wherein peripheral modules are configured to transmit said sensing signals in a selective way, in the framework of respective transmission time slots determined by said main unit, and wherein said main unit is configured in such a way that it can selectively go, at least in part, into a state of reduced power absorption in the absence of useful information to be received from said peripheral modules.

29. The system according to claim 28, wherein said main unit is configured in such a way as to inhibit its own receiving function at intervals corresponding to the time slots assigned for transmission to peripheral sensors which currently do not have any sensing signal to transmit to the main unit itself.

30. A system for data transmission, on board a vehicle, comprising:

a set of peripheral modules which can be associated to respective sensors for generating respective sensing signals; and a main unit designed to receive said sensing signals coming from said set of peripheral modules, and wherein peripheral modules are configured to transmit said sensing signals in a selective way, in the framework of respective transmission time slots determined by said main unit, and wherein said peripheral modules comprise, at least in part, a respective module for pre-processing the sensing signal from the corresponding associated sensor.

31. A system for data transmission, on board a vehicle, comprising:

a set of peripheral modules which can be associated to respective sensors for generating respective sensing signals; and a main unit designed to receive said sensing signals coming from said set of peripheral modules, and wherein said peripheral modules are configured to transmit said sensing signals in a selective way, in the framework of respective transmission time slots determined by said main unit, and wherein said peripheral modules carry associated thereto, at least in part, respective power-supply sources, each of which preferably has associated thereto, a circuit for monitoring the state of said power-supply source.

32. The system according to claim 31 wherein said peripheral modules are configured for associating, to said sensing signal of the respective sensor sent to said main unit, a further signal indicating the state of the respective power-supply source.

33. A system for data transmission, on board a vehicle comprising:

a set of peripheral modules which can be associated to respective sensors generating respective sensing signals; and a main unit designed to receive said sensing signals coming from said set of peripheral modules, and wherein said peripheral modules are configured to transmit said sensing signals in a selective way, in the framework of respective transmission time slots determined by said main unit, and wherein said main unit is configured for transmitting, to said peripheral modules, a verification signal indicating the outcome of the previous communication to the main unit itself.

34. The system according to claim 33 comprising at least one peripheral module which can be associated to a respective sensor for generating the sensing signal represented by a counting value, and in that said at least on peripheral module is capable of detecting, starting from the verification signal received from said main unit, failure of transmission of a previous counting value and of carrying out the subsequent transmission of a counting-detection signal as a cumulative value of the value transmitted in the previous transmission and not received, and of the amount of the counting accumulated starting from said previous transmission.

35. The system according to claim 33, wherein said main unit is configured for detecting a persistence of transmission events having negative outcome coming from one of said peripheral modules and for consequently varying the respective network address.

36. A system for data transmission, on board a vehicle, comprising:
    a set of peripheral modules which can be associated to respective sensors for generating respective sensing signals; and
    a main unit designed to receive said sensing signals coming from said set of peripheral modules,
    and wherein said peripheral modules are configured to transmit said sensing signals in a selective way, in the framework of respective transmission time slots determined by said main unit,
    and wherein said main unit is identified by a respective network address, and in that said main unit is configured for selectively communicating variations in said network address to said peripheral modules.

37. A system for data transmission, on board a vehicle, comprising:
    a set of peripheral modules which can be associated to respective sensors for generating respective sensing signals, said signals having only data representative of a sensed condition and not data representative of the identity of the particular peripheral module generating the sensing signal, said modules only generating a sensing signal when said sensors detect a condition exceeding a preprogrammed limit condition, and
    a main unit designed to receive said sensing signals coming from said set of peripheral modules, including means for determining the identity of the particular peripheral module generating the sensing signal.

38. The system of claim 37, said identity determining means comprising synchronization signal generating means on said main unit and synchronization means on each of said peripheral modules, each of said modules only generating a sensing signal during an assigned time slot relative to the synchronization signal.

39. The system of claim 38, said synchronization signal means generating a periodic signal and wherein said time slots are identified according to a respective delay signal starting from said synchronization signal.

* * * * *